United States Patent [19]
Chen

[11] Patent Number: 5,241,877
[45] Date of Patent: Sep. 7, 1993

[54] GEAR SELECTOR

[76] Inventor: Chun-Hsung Chen, No. 18-1, Nan-Yang Rd., Feng-Yuan City, Taiwan

[21] Appl. No.: 986,141

[22] Filed: Dec. 4, 1992

[51] Int. Cl.⁵ .......................... G05G 11/00; F16C 1/10
[52] U.S. Cl. ...................... 74/489; 74/475; 74/502.2; 74/506; 74/505
[58] Field of Search ............ 74/489, 475, 506, 505, 74/502.2, 526, 527, 523, 524, 525

[56] References Cited

U.S. PATENT DOCUMENTS

| | | | |
|---|---|---|---|
| 2,874,587 | 2/1959 | Schmid | 74/489 |
| 3,180,166 | 4/1965 | Fox | 74/489 |
| 3,218,879 | 11/1965 | Reed | 74/489 |
| 3,856,123 | 12/1974 | Kinsey | 74/489 |
| 4,019,402 | 4/1977 | Leonheart | 74/502.2 |
| 4,232,565 | 11/1980 | Leonheart | 74/489 |
| 4,286,699 | 9/1981 | Pawelka | 74/489 X |
| 4,352,303 | 10/1982 | Christner | 74/489 |
| 4,526,056 | 7/1985 | Yamanaka | 74/506 X |
| 5,134,897 | 8/1992 | Romano | 74/475 X |
| 5,186,072 | 2/1993 | Nagano | 74/502.2 X |

FOREIGN PATENT DOCUMENTS

0423779 4/1991 European Pat. Off. ............ 74/489
1131541 6/1962 Fed. Rep. of Germany ........ 74/489
531170 12/1957 Italy .................................... 74/502.2

Primary Examiner—Vinh T. Luong
Attorney, Agent, or Firm—Merchant Gould Smith Edell Welter & Schmidt

[57] ABSTRACT

A gear selector includes a sleeve member which has an annular flange that extends radially and outwardly from the periphery of one end of the sleeve member. The flange has a circumferential groove to receive a curved member which has a plurality of retaining grooves. The flange further has an annular extension with a guide rail that is formed circumferentially on an external surface, an abutting face, a receiving space, and a notch which interconnects the receiving space and the guide rail. A tubular member has a casing with a retractable projection at one end. When the sleeve member is sleeved rotatably on the tubular member, the retractable projection extends into one of the retaining grooves of the curved member so as to retain the sleeve member at a predetermined position relative to the tubular member. A cable has one end fixed in the tubular member and passes through the notch. The cable encircles the guide rail before being led out of the tubular member. The second end of the cable is connected to the gear changing device of a bicycle.

3 Claims, 8 Drawing Sheets

GEAR SELECTOR

BACKGROUND OF THE INVENTION

1. Field of The Invention

The invention relates to a gear selector, more particularly to a gear selector which is to be employed in a bicycle.

2. Description of The Related Art

A conventional gear selector of a bicycle is generally installed adjacent to the handle of the bicycle. While riding a bicycle, the user's hands grip the handle of the bicycle in order to balance the bicycle. When changing the speed of the bicycle, the user has to operate the gear selector while gripping the handle of the bicycle. Thus inconveniencing the user. Furthermore, the simultaneous operation of the gear selector and the gripping of the handle can cause the user to lose control of the bicycle, thereby possibly leading to an accident.

SUMMARY OF THE INVENTION

A main object of the present invention is to provide a gear selector for a bicycle which gear selector is fixed partially and rigidly on the handle of the bicycle. A section of the gear selector is rotatable relative to the handle. In the event that the speed of the bicycle is to be changed, the user simply rotates the handle of the bicycle to achieve the speed changing purpose.

According to the present invention, the gear selector includes a tubular member sleeved rigidly on the handle of the bicycle and a sleeve member sleeved rotatably on the tubular member. The sleeve member has a first end and a second end opposite to the first end. An annular first flange extends radially and outwardly from the periphery of the first end of the sleeve member. The first flange has an external surface which is formed with a circumferential groove of predetermined length. An annular extension extends axially from the periphery of the first flange. The annular extension has an annular abutting face and a guide rail formed circumferentially on an external surface thereof. The annular extension confines a receiving space therein and is formed with a notch which interconnects the receiving space and the guide rail. A curved member with an angular length which is smaller than the predetermined angular length of the groove is provided movably in the groove. The curved member has a plurality of retaining grooves formed along the periphery of the same. The tubular member has an inner face with an annular projection formed around a first end of the same, a second end opposite to the first end a stop member provided on the inner face, and a retractable projection. When the sleeve member is sleeved rotatably on the tubular member, the annular projection of the tubular member is received in the receiving space of the annular extension, the annular abutting face of the annular extension abuts the inner face of a flange member which extends radially and outwardly from the periphery of the first end of the tubular member, while the retractable projection extends into one of the retaining grooves of the curved member. Thus, the sleeve member is retained at a predetermined position relative to the tubular member. A cable has a first end fixed to the annular projection of the tubular member and a second end which passes through the notch of the annular abutting face of the annular extension so as to encircle the guide rail in a clockwise direction before being guided out of the gear selector in order to join with the gear mechanism of the bicycle. When riding the bicycle, if the user desires to change the speed of the bicycle, he or she simply rotates the sleeve member in a counterclockwise direction relative to the tubular member, thereby achieving the gear changing purpose.

BRIEF DESCRIPTION OF THE DRAWINGS

Other features and advantages of the present invention will become more apparent in the following detailed description, including drawings, all of which includes a non-limiting form of the present invention, in which.

DETAILED DESCRIPTION OF THE PREFERRED EMBODIMENT

Figure 1:
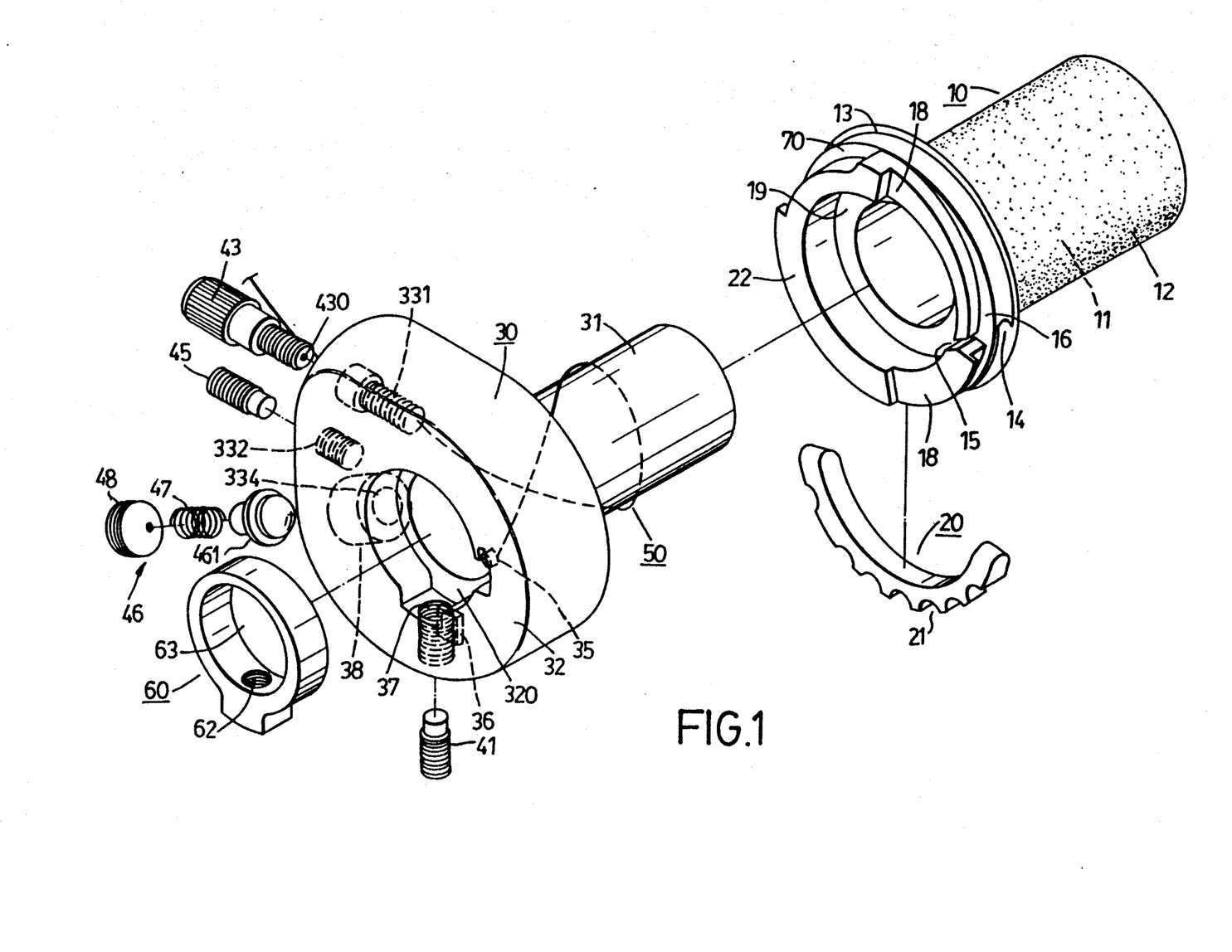
FIG. 1 shows an exploded view of a gear selector of the present invention.

Referring to FIG. 1, an exploded view of a gear selector according to the present invention is shown to comprise a sleeve member (10), a curved member (20), a tubular member (31), a cable (50) and a retaining ring (60).

Figure 2:
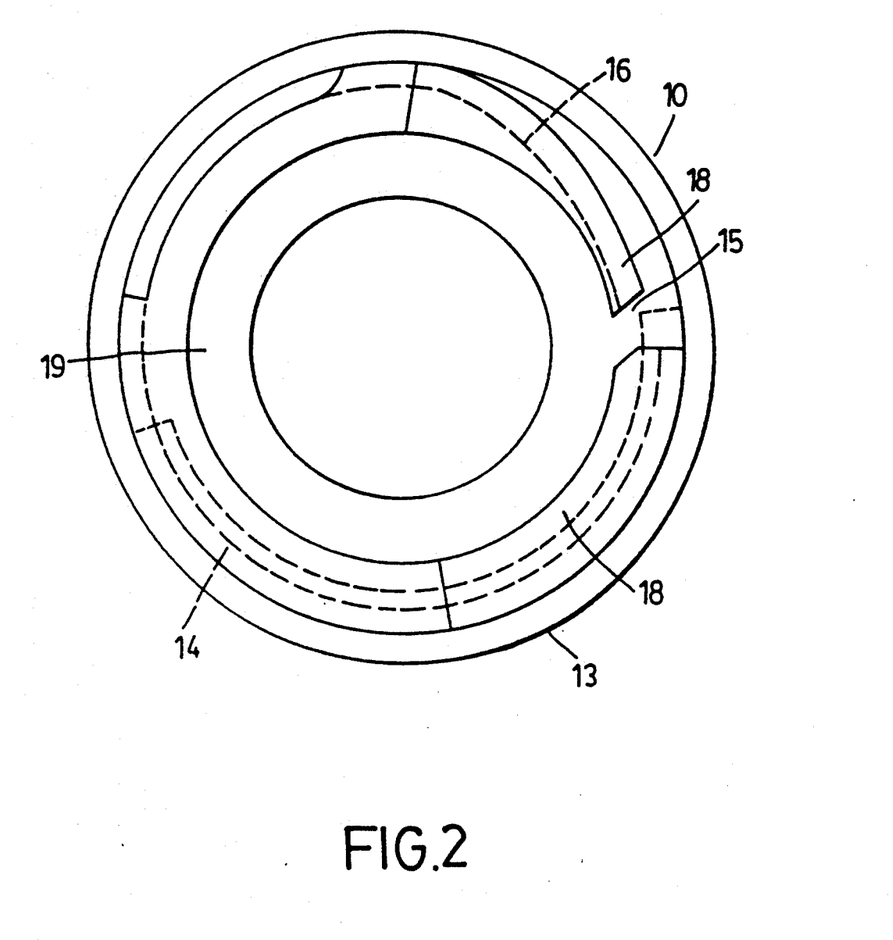
FIG. 2 shows a sleeve member of the gear selector of FIG. 1 when viewed from a front side.

The sleeve member (10) in the preferred embodiment is made from an engineering plastic and is a hollow member (11) that is covered by a soft rubber coating (12) to facilitate handling thereof. The sleeve member (10) has a first end and a second end opposite to the first end. An annular first flange (13) extends radially and outwardly from the periphery of the first end of the sleeve member (10). The first flange (13) has a groove (14) of predetermined angular length formed circumferentially on an external surface of the same. The first flange (13) further has an annular extension (70) which extends axially from the periphery of the same. The annular extension (70) has an annular abutting face (22) and a guide rail (16) that is formed circumferentially on an external surface thereof. The annular extension (70) confines a first receiving space (19) therein and is formed with a notch (15) which interconnects the first receiving space (19) and the guide rail (16). The depth of guide rail (16) is greatest adjacent to the notch (15) and gradually decreases therefrom in order to guide a cable (50) firmly therealong. The annular abutting face (22) further includes a stepped portion (18) with two opposite ends. The notch (15) passes through the stepped portion (18), thereby dividing the stepped portion (18) into a first abutting face and a second abutting face which has a depth that is greater than the first abutting face when measured from the annular abutting face (22) of the annular extension (70). The purpose of the stepped portion (18) will be described in the following paragraphs.

Figure 3:
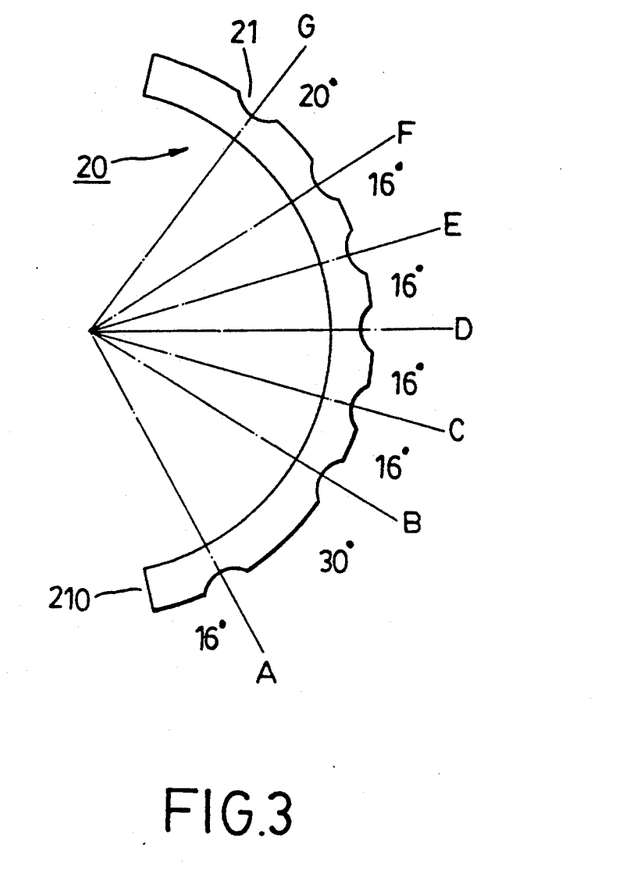
FIG. 3 is a curved member of the gear selector of the present invention.
Figure 4:
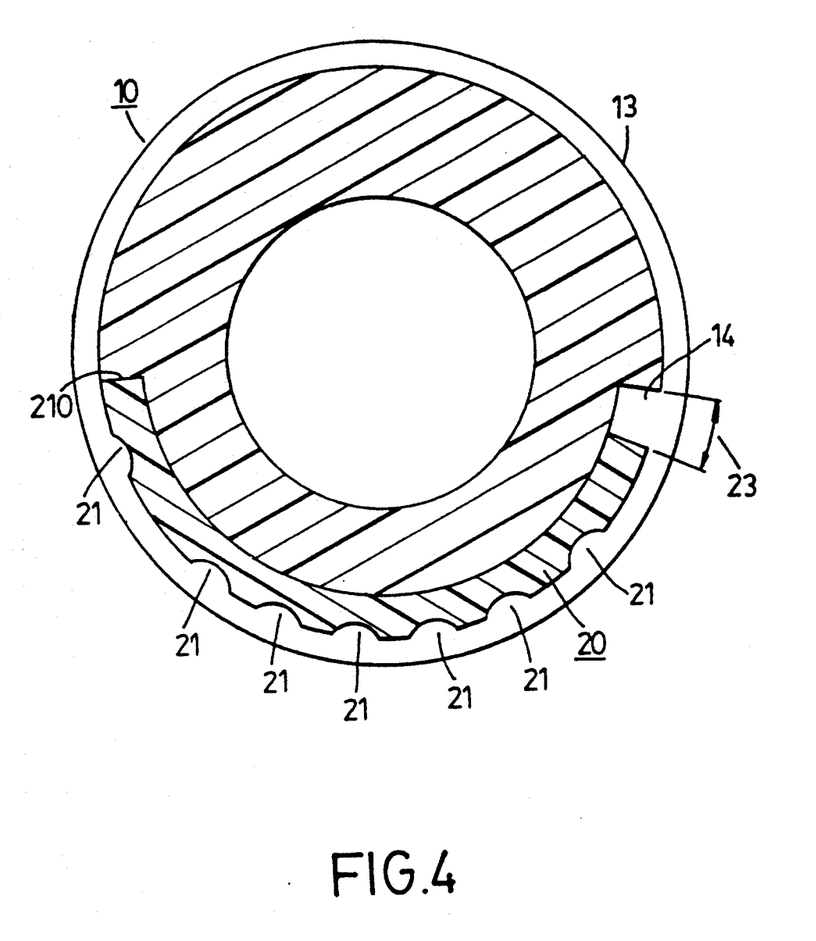
FIG. 4 is a cross sectional view of the gear selector of the present invention, illustrating the position of the curved member shown in FIG. 3.

Referring to FIGS. 3 and 4, a curved member (20), which is made from an engineering plastic, is provided movably in the circumferential groove (14) of the first flange (13). Since the curved member (20) has an angular length that is smaller than that of the predetermined angular length of the groove (14), a clearance (23) is formed between one end of the curved member (20) and the groove (14). The curved member (20) has a plurality of curved retaining grooves (21) formed along the periphery of the same. In the preferred embodiment, the curved retaining grooves (21) are arranged in such a manner in order to match with a seven-step gear changing device of the rear bicycle wheel. The angle measured from the extreme end (210) of the curved member to a first retaining groove (A) is 16 degrees relative to the center of the first flange (13), from the retaining groove (A) to the retaining groove (B) is 30 degrees, from (B) to (C), from (C) to (D), from (D) to (E) and from (E) to (F) are 16 degrees each, while the angle measured from the retaining groove and (F) to (G) is 20 degrees. The clearance (23) is 16 degrees wide relative to the center of the annular first flange (13) and facilitates the precision of the gear changing procedure of the rear bicycle wheel. The clearance (23) also aids in the removal of the residual stress of a spring of the gear changing device of the bicycle. Each of the retaining grooves (A-G) represents a corresponding bicycle speed.

Figure 5:
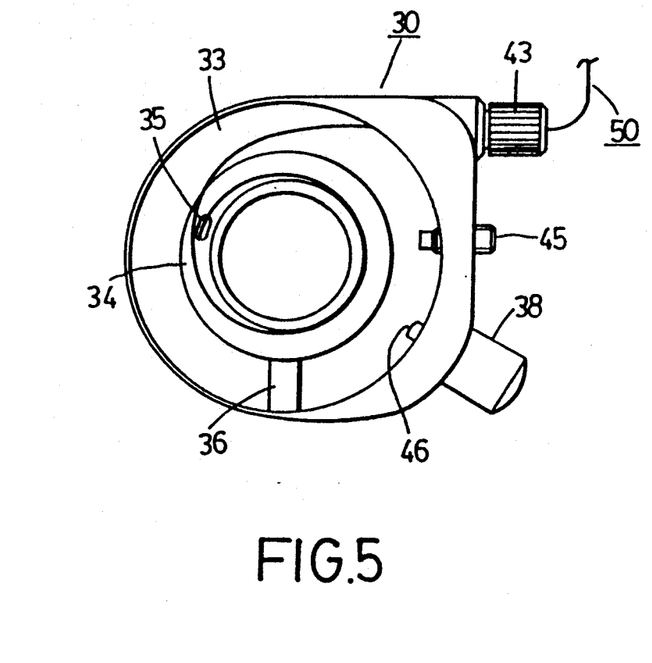
FIG. 5 shows the gear selector of the present invention after assembly, the gear selector being viewed from a bottom side.
Figure 6:
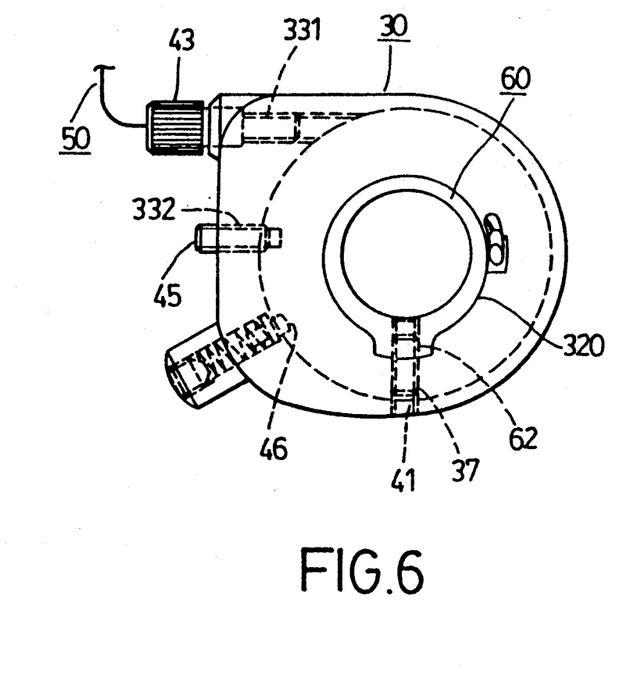
FIG. 6 shows the gear selector of the present invention, the gear selector being viewed from a top side.
Figure 7:
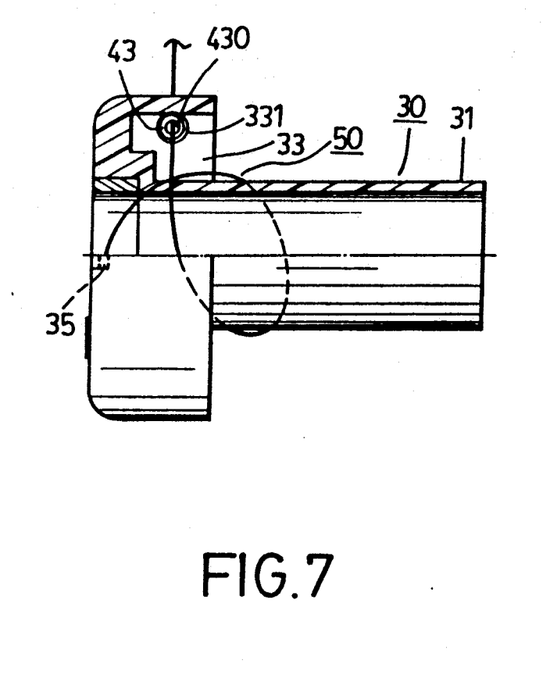
FIG. 7 is a side view of the gear selector of the present invention.
Figure 8:
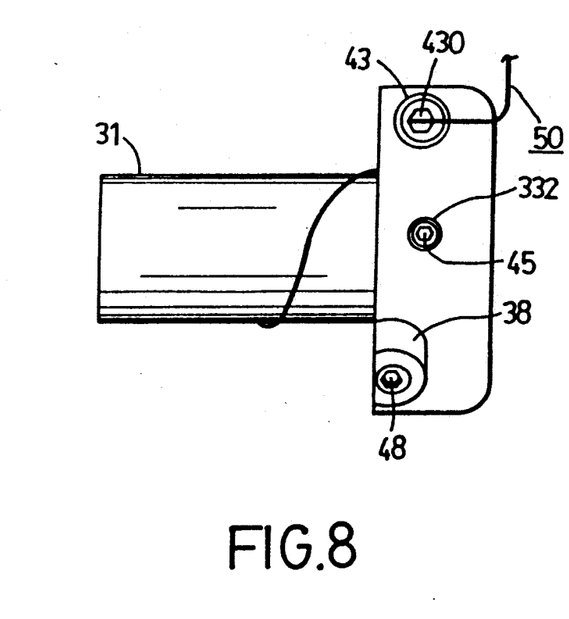
FIG. 8 is another side view of the gear selector of the present invention.

Referring to FIGS. 5 and 6, the tubular member (31) is sleeved on the handle (80) of the bicycle and has a first end with an annular second flange (32), which extends radially and outwardly from the periphery of the first end, and a third flange (30) that extends axially from the periphery of the second flange (32) towards a second end of the tubular member (31) opposite to the first end of the latter. The second flange (32) has an inner face with an annular projection (34) formed around the tubular member (31) and a stop member (36). An external face of the second flange (32) has a second receiving space (320) which receives a retaining ring (60). The retaining ring (60) has a central bore (63) that is aligned and communicated with the tubular member (31). The retaining ring,(60) further has a threaded-hole (62) that extends radially therethrough.

Figure 9:
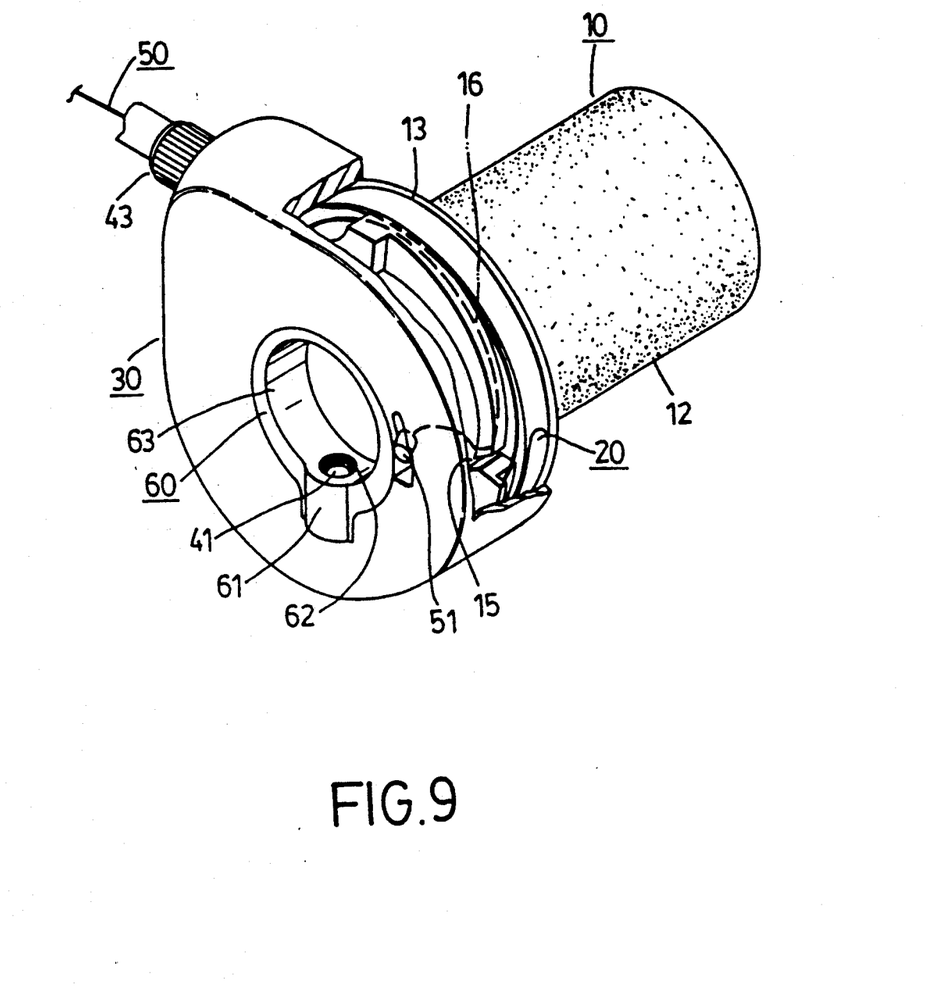
FIG. 9 shows a partially exploded view of the gear selector of the present invention.
Figure 10:
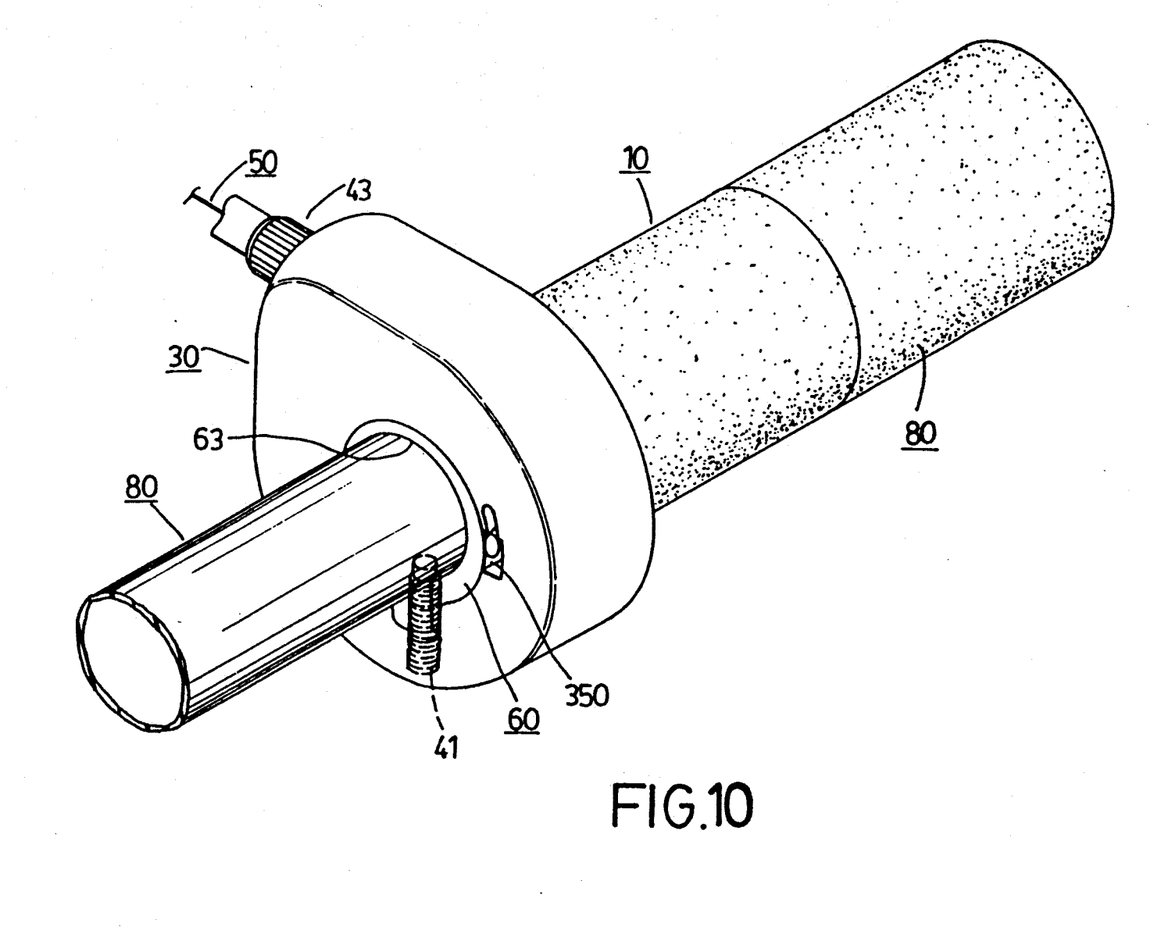
FIG. 10 shows the gear selector of the present invention when installed on the handle of a bicycle.

The third flange (30) has a first threaded-bore (331) that extends therethrough in order to receive an externally threaded adjustable screw member (43), and a first retaining threaded-hole (332) in which a first retaining bolt (45) is inserted threadedly so as to engage the sleeve member (10) and the tubular member (31) when the former is sleeved rotatably on the latter. The third flange (30) is further provided with a receiving chamber (38) which receives a compression spring (47) and a projection (461) therein. One end of the receiving chamber (38) is blocked by a blocking member (48) while another end of the same has a narrow opening through which the projection (461) protrudes resiliently. The third flange (30) further has a second threaded retaining hole (37) which is aligned with the threaded-hole (62) of the retaining ring (60). A second retaining bolt (41) extends through the second threaded retaining hole (37) of the third flange (30) and the threaded-hole (62) of the retaining ring (60) so as to secure the tubular member (31) on the handle (80) of the bicycle, as shown in FIG. (10). The adjustable screw member (43) further defines a through-hole (430) therethrough.

After the sleeve member (10) has been sleeved slidably and rotatably on the tubular member (31), the annular abutting face (22) of the annular extension (70) abuts with the inner face of the second flange (32), the annular projection (34) of the second flange (32) is received in the first receiving space (19) of the annular extension (70), while the retractable projection (46) extends resiliently into one of the retaining grooves (21) of the curved member (20), thereby retaining the sleeve member (10) at a predetermined position relative to the tubular member (31). Under this condition, the stop member (36) extends into the stepped portion (18) of the annular extension (70). The two opposite ends of the stepped portion (18) limits the angular rotation of the sleeve member (10) relative to the tubular member (31). The stop member (36) further strengthen the rigidity of the second threaded retaining hole (37) of the second flange (32).

Since the annular projection (34) of the second flange (32) has a retaining hole (35), a first end of the cable (50) is retained in the retaining hole (35) by means of a lead bud (51). the cable (50) passes through the notch (15) of the annular extension (70) and encircles the guide rail (16) in a clockwise direction before being guided out of the third flange (30). The second end of the cable (50) extends through the through-hole (430) which is defined by the adjustable screw member (43), and connects with the gear changing device that is installed at the rear bicycle wheel (not shown in the drawings) under tension. As to how the second end of the cable (50) is connected to the gear changing device of the bicycle is not directly concerned with the present invention, a detailed description of such will be omitted here. The cable (50) does not derail from the guide rail (16) because the guide rail (16) has the greatest depth adjacent to the notch (15). The tension of the cable (50) can be adjusted as desired by operating the adjustable screw member (43).

While riding the bicycle, if the user desires to change the speed of the bicycle, he or she needs not change the position of his or her hands. The sleeve member (10) is simply rotated in a counter clockwise direction relative to the tubular member (31). The rotation of the sleeve member (10) pulls the second end of the cable (50), thereby operating the gear changing device of the bicycle. The curved member (20) rotates together with the sleeve member (10) such that the curved member (20) passes slidably over the retractable projection (46) of the third flange (30) so that the retractable projection (46) can extend into another retaining groove (22), thereby retaining the sleeve member (10) at another position relative to the tubular member (31). This illustrates how the gear changing purpose is achieved.

While a preferred embodiment has been illustrated and described, it will be apparent that many changes and modifications may be made in the general construction and arrangement of the present invention without departing from the spirit and scope thereof. Therefore, it is desired that the present invention be not limited to the exact disclosure but only to the extent of the appended claims.

I claim:
1. A gear selector comprising:
 a sleeve member having a first end and a second end opposite to said first end, an annular first flange extending outwardly and radially from the periphery of said first end, said annular first flange including a groove that has a predetermined angular length and that is formed circumferentially on an external surface of said first flange, said first flange further including an annular extension extending axially from the periphery thereof, said annular extension having a guide rail formed circumferentially on an external surface of said annular extension and disposed adjacent to said annular groove, said annular extension further having an annular abutting face and confining a first receiving space therein, said annular extension having a notch which interconnects said guide rail and said first receiving space;

a slidable curved member with an angular length that is smaller than said predetermined angular length of said groove, said curved member being provided movably in said groove and having a plurality of spaced, curved retaining grooves formed along the periphery of said curved member;

a tubular member having a first end and a second end opposite to said first end, said first end of said tubular member having an annular second flange, which extends radially and outwardly from the periphery of said first end, and a third flange which extends axially from the periphery of said second flange towards said second end of said tubular member, said second flange having an inner face with an annular projection formed around said tubular member, said sleeve member being sleeved slidably and rotatably on said tubular member, said annular abutting face of said annular extension abutting with said inner face of said annular second flange, said annular projection of said annular second flange being received in said first receiving space of said annular extension, said annular projection further having a retaining hole that extends therethrough, said third flange further having a first threaded bore extending therethrough and receiving an externally threaded adjustable screw member therein, a retaining threaded-hole extending transverse to said third flange and receiving a first retaining bolt therein, said first retaining bolt preventing said sleeve member from disengaging said tubular member, said third flange further having a retractable projection disposed radially relative to said tubular member and extending resiliently into one of said curved retaining grooves of said slidable curved member so as to retain said sleeve member at a predetermined position relative to said tubular member, said adjustable screw member defining a through-hole therethrough, said through-hole communicating an interior of said third flange with an exterior of said third flange, said second flange further having a second receiving space formed on an external face opposite to said inner face thereof, a retaining ring being provided on said external face and defining a central bore that is aligned and communicated with said tubular member and a threaded hole extending radially through said retaining ring, said third flange further having a second threaded-bore aligned with said threaded-hole of said retaining ring;

a second retaining bolt extending threadedly through said second threaded-bore of said third flange and said threaded-hole of said retaining ring to engage said third flange and said retaining ring;

a cable having a first end fixed in said retaining hole of said annular projection of said second flange and a second end which passes passing through said notch of said annular abutting face to encircle said guide rail in a clockwise direction when said cable is viewed from said second end of said tubular member, said second end of said cable being guided out of said third flange under tension through said through-hole defined by said adjustable screw member; and rotation of said sleeve member in a counterclockwise direction relative to said tubular member causing said slidable curved member to rotate with said sleeve member, said slidable curved member pushing synchronously said retractable projection to retract into said third flange and permitting rotation of said sleeve member relative to said tubular member, rotation of said sleeve member consequently winding said cable thereon to pull correspondingly said second end of said cable.

2. A gear selector as defined in claim 1, wherein said inner face of said second annular flange has a stop member formed thereon, said annular abutting face of said annular extension further includes a stepped portion which has two opposite ends, said notch passing through said stepped portion and dividing said stepped portion into a first abutting face and a second abutting face which has a depth greater than said first abutting face relative to said annular abutting face of said annular extension, said stop member extending into said stepped portion and being movable between said two opposite ends of said stepped portion when said sleeve member is rotated relative to said tubular member.

3. A gear selector as defined in claim 1, wherein said guide rail has a depth which is greatest at a point adjacent to said notch and which gradually decreases from said point in a clockwise direction.

* * * * *